US011985206B2

United States Patent
Dukellis

(10) Patent No.: US 11,985,206 B2
(45) Date of Patent: May 14, 2024

(54) NOTIFICATION THROTTLING

(71) Applicant: Google LLC, Mountain View, CA (US)

(72) Inventor: John Nicholas Dukellis, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/146,782

(22) Filed: Dec. 27, 2022

(65) Prior Publication Data

US 2023/0138116 A1   May 4, 2023

Related U.S. Application Data

(63) Continuation of application No. 17/289,444, filed as application No. PCT/US2020/017868 on Feb. 12, 2020, now Pat. No. 11,595,491.

(51) Int. Cl.
| | | |
|---|---|---|
| G06F 15/16 | (2006.01) | |
| G06F 9/54 | (2006.01) | |
| H04L 67/55 | (2022.01) | |
| H04L 67/61 | (2022.01) | |

(52) U.S. Cl.
CPC .............. *H04L 67/55* (2022.05); *G06F 9/542* (2013.01); *H04L 67/61* (2022.05)

(58) Field of Classification Search
None
See application file for complete search history.

(56) References Cited

U.S. PATENT DOCUMENTS

| | | | | |
|---|---|---|---|---|
| 2002/0087649 A1* | 7/2002 | Horvitz | ................... | H04L 51/00 709/207 |
| 2008/0272907 A1* | 11/2008 | Bonansea | ............. | H04M 1/724 340/539.11 |
| 2008/0306950 A1* | 12/2008 | Richards | ................. | G06F 9/505 |
| 2012/0295645 A1* | 11/2012 | Yariv | ...................... | H04W 4/12 455/466 |
| 2013/0346882 A1 | 12/2013 | Shiplacoff et al. | | |

(Continued)

FOREIGN PATENT DOCUMENTS

| | | |
|---|---|---|
| CN | 104412217 | 3/2015 |
| CN | 106034069 | 10/2016 |

(Continued)

OTHER PUBLICATIONS

Office Action in Japanese Appln. No. 2021-530223, dated Sep. 5, 2022, 10 pages (with English translation).

(Continued)

*Primary Examiner* — Phyllis A Book
(74) *Attorney, Agent, or Firm* — Fish & Richardson P.C.

(57) ABSTRACT

An electronic device is configured with a notification throttling system. The notification throttling system obtains a set of priorities for multiple applications that are installed on the electronic device and are enabled for alerting the user via notifications. The set of priorities specifies a relative importance of each particular application among the multiple applications. The notification throttling system throttles application alerts presented by the user device for notifications generated by the applications based on the relative importance of each particular application as specified by the set of priorities.

20 Claims, 7 Drawing Sheets

(56) References Cited

U.S. PATENT DOCUMENTS

| | | | |
|---|---|---|---|
| 2014/0179377 A1* | 6/2014 | Song | H04M 1/72403 455/566 |
| 2015/0026324 A1 | 1/2015 | Rheinheimer et al. | |
| 2015/0188871 A1 | 7/2015 | Lewis et al. | |
| 2016/0191453 A1* | 6/2016 | Thomas | H04L 51/52 709/206 |
| 2016/0253415 A1* | 9/2016 | Zhong | G06F 16/345 707/722 |
| 2017/0083165 A1* | 3/2017 | Ali | H04L 41/0622 |
| 2017/0235628 A1* | 8/2017 | Nguyen | G06F 11/0751 714/37 |
| 2018/0046929 A1* | 2/2018 | Xuan | G06Q 10/00 |
| 2018/0270317 A1* | 9/2018 | Feng | H04L 67/55 |
| 2018/0288736 A1* | 10/2018 | Raman | H04L 43/20 |
| 2019/0179824 A1* | 6/2019 | Filippi | H04L 41/0631 |
| 2019/0289367 A1 | 9/2019 | Siddiq | |
| 2019/0289368 A1 | 9/2019 | Redmond et al. | |
| 2019/0342252 A1 | 11/2019 | Dascola et al. | |
| 2019/0355469 A1* | 11/2019 | Chan | G08B 25/016 |
| 2020/0192700 A1 | 6/2020 | Maniyar | |
| 2020/0226277 A1* | 7/2020 | Roden | G06F 21/6281 |
| 2020/0379744 A1* | 12/2020 | Bhupati | H04L 67/61 |
| 2020/0387411 A1 | 12/2020 | Chu et al. | |
| 2021/0060442 A1* | 3/2021 | Juenger | A63F 13/795 |

FOREIGN PATENT DOCUMENTS

| | | | |
|---|---|---|---|
| CN | 107251065 | 10/2017 | |
| CN | 108028857 | 5/2018 | |
| CN | 108400927 | 8/2018 | |
| CN | 108710466 | 10/2018 | |
| CN | 108965612 | 12/2018 | |
| CN | 109313559 | 2/2019 | |
| EP | 3255539 | 12/2017 | |
| JP | 2003-140798 | 5/2003 | |
| JP | 2003-186704 | 7/2003 | |
| JP | 2004-178073 | 6/2004 | |
| JP | 2009-089104 | 4/2009 | |
| JP | 2014-519126 | 8/2014 | |
| JP | 2016-062562 | 4/2016 | |
| JP | 2017-037574 | 2/2017 | |
| JP | 2019-522843 | 8/2019 | |
| JP | 2019-536131 | 12/2019 | |
| JP | 2020-501247 | 1/2020 | |
| TR | 201702274 | 12/2017 | |
| WO | WO 2015055368 | 4/2015 | |
| WO | WO 2017211962 | 12/2017 | |
| WO | WO-2017211962 A1 * | 12/2017 | A63F 13/211 |
| WO | WO-2018213692 A1 * | 11/2018 | G06F 21/6218 |

OTHER PUBLICATIONS

International Search Report and Written Opinion in International Appln. No. PCT/US2020/017868, dated Oct. 27, 2020, 14 pages.
Notice of Allowance in European Appln. No. 20711391.1, mailed on Jul. 12, 2023, 8 pages.
Office Action in Chinese Appln. No. 202080006408.3, mailed on Sep. 6, 2023, 30 pages (with English translation).
Extended European Search Report in European Appln. No. 23195554.3, mailed on Dec. 12, 2023, 10 pages.
Office Action in Indian Appln. No. 202127019792, mailed on Dec. 21, 2023, 4 pages (With English translation).
Office Action in Japanese Appln. No. 2021-530223, mailed on Mar. 11, 2024, 30 pages (with English translation).

* cited by examiner

NOTIFICATIONS PRIORITY ASSIGNMENT

| Application | Priority | # Day | # Month (Suppressed) |
|---|---|---|---|
| App 1 | 1 v | 23 | 240 |
| App 2 | 2 v | 1 | 6 |
| App 3 | 3 v | 1 | 25 |
| App 4 | 4 v | 15 | 250 (-60) |
| App 5 | 5 v | 0 | 1 (-1) |
| App 6 | 6 v | 40 (-37) | 600 (-570) |

[x] Do NOT show between v  10pm and 7am

| Priority # | Notification Limit | If Exceeded... | Per App / Total |
|---|---|---|---|
| Priority 1: | Always Show v | N/A v | N/A v |
| Priority 2: | Limit 5 per hour v | Queue v | Per App v |
| Priority 3: | Limit 5 per day v | Drop v | Total v |
| Priority 4: | Do not display v | Drop v | N/A v |

( View Suppressed Notifications )

FIG. 4A

NOTIFICATION THROTTLING

CROSS-REFERENCE TO RELATED APPLICATION

This application is a continuation application of, and claims priority to, U.S. patent application Ser. No. 17/289,444, filed on Apr. 28, 2021, which application is a National Stage Application under 35 U.S.C. § 371 and claims the benefit of International Application No. PCT/US2020/017868, filed Feb. 12, 2020. The disclosures of the foregoing applications are hereby incorporated by reference in its entirety.

BACKGROUND

Currently available electronic devices (e.g., smart phones and electronic tablets) enable applications to generate notifications that are displayed on the screen of the device (e.g., the lock screen or the unlocked screen). This feature enables a user to quickly look at information updates contained in the notifications (e.g., what the user has missed or other updates) from various applications and quickly and easily determine whether the user needs to act upon a particular notification.

SUMMARY

When a device has a large number of applications installed, those applications can generate a large amount of notifications causing a number of issues. For example, if there are two hundred applications installed on a device, those applications generate, in some instances, over one hundred notifications over a relatively short amount of time (e.g., one minute, one hour, or another period of time). This problem is compounded if a user does not clear those notifications quickly because the notifications continue to accumulate and can quickly become unmanageable and/or ignored. For example, the user may be inundated with a large amount of information where a large percentage of that information is not of interest at that time. That in turn will degrade user experience. Another problem involves power management. Many electronic devices such as smart phones or electronic tablets work from a battery and are recharged at certain intervals (e.g., nightly). A large number of notifications, in many cases, will drain the battery quickly. For example, some users set their electronic devices to vibrate, play a sound and/or flash a light when a notification from an application is presented. If the electronic device generates hundreds of notification per hour, those actions can drain the device's battery very quickly.

A solution to both of these problems is to throttle the number of notifications that get presented to the user (e.g., displayed on a screen). Specifically, the electronic device is configured with a system that assigns a priority to each application installed on the device and enabled for application alerting. For example, some applications are configured to not alert the user, while other applications can be assigned into two or more groups for alerting.

In some implementations, a notification throttling system obtains a set of priorities for multiple applications that are installed on a user device and are enabled for alerting the user via notifications. The set of priorities specifies a relative importance of each particular application among the multiple applications. For example, each application that is configured for alerting (e.g., alerting for the application is not disabled) is assigned to one of multiple groups (e.g., high priority, medium priority, or low priority). Of course, the number of groups used to assign relative priorities of applications can vary as desired and/or appropriate.

When the applications are assigned to groups, the group assignments are used to throttle the notifications for those applications. More specifically, the notification throttling system can throttle (e.g., allow or prevent) application alerts presented by the user device for notifications generated by the applications based on the relative importance of each particular application as specified by the set of priorities. For example, when the number of notifications generated by the applications reaches a specified level, the notification throttling system can allow notifications from a higher priority application to trigger an alert, while preventing notifications from a lower priority application from triggering an alert.

To illustrate a particular example, assume that application one is an email application having a higher priority than application two, which is a game application. In this particular example, the notification throttling system can identify the relative priorities of the two applications (e.g., based on their group assignments), and process the notifications from those applications accordingly. More specifically, in this particular example, the notification throttling system can allow the email application notification to trigger an application alert, while preventing the game application from triggering an application alert, thereby throttling the number of application alerts that are presented by the user device.

The notification throttling system may take a status of the user device into account when making a throttling decision. For example, as described above, notifications have an impact on power management. In one example, the notification throttling system may determine a status of the battery in the user device. If, for example, the battery status indicates that the remaining battery charge is relatively low, the notification throttling system may throttle the notifications so as to reduce the number of notifications generated at the user device. In this way, the notification throttling system actively conserves power dependent on the operational status of the device. In another example, the throttling system may determine that the user device is currently charging and therefore may reduce the throttling of the notifications, increasing the number of notifications generated at the user device. In other examples, the device type or the current processing load of the device may also be determined by the notification throttling system and used in the throttling decision process.

When the applications are assigned to groups, the groups are used to throttle the notifications. Specifically, the notification system throttles application based on the relative importance of each particular application as specified by the set of priorities. To perform the throttling operation the notification throttling system determines that a first application having a higher level of relative importance than a second application has generated a first notification during a specified time period, and that the second application has also generated a second notification during the specified time period. For example, if application one is an email application having a higher priority than application two, a game, the notification throttling system makes that determination and processes the notifications from those applications accordingly. In some cases, the user device will have hundreds of applications installed and will have more than two priority levels (e.g., five or six priority levels). The applications are assigned appropriate priority levels and the notification throttling system processes notifications according to the priority levels assigned.

The notification throttling system generates an application alert for the first notification, but not for the second notification. Specifically, the notification throttling system generates an application alert for the first notification, but not the second notification, based on (i) the first application having a higher level of relative importance than the second application and (ii) the first notification and the second notification both being generated during the specified time period. For example, if the email application is an application with a higher priority level than the game, the notification throttling system determines that both notifications cannot be presented in view of the throttling state for the current time period, and generates an application alert for the notification from the email application and not for the game. At that point, the notification throttling system presents the generated application alert for the first notification (e.g., by displaying the application alert on the screen, playing a sound and/or flashing a light).

In some implementations, the notification throttling system generates some application alerts for some notifications and refrains from generating application alerts for other notifications for a period of time so that applications alerts can be generated for more important notifications received at a later point during the period of time. For example, the notification throttling system can generate application alerts for notifications from applications have high importance, but hold off generating application alerts for applications with low importance until a later time during the period. In another example, the notification throttling system generates an alert satisfaction score to determine when to generate application alerts for received notifications. The alert satisfaction score can be generated based on the number of notifications that have been received from various applications without application alerts generated and the amount of time left in the current time period. In another example, the alert satisfaction score can be adjusted as the time period proceeds towards the end.

In some implementations, alert notifications are generated with third party content that can be provided by a remote system. Some examples of third party content include advertisements, various information related to the application that generated the notification, or other suitable third party content.

In some implementations, the notification throttling system enables a user (e.g., through an interface) to assign applications to a specific group. For example, the notification throttling system can present an interface to the user (e.g., during application install) to add the application being installed to a group. The interface can be configured to include a recommendation of a default group to place the application into.

The notification throttling system provides several advantages. The notification throttling system enables a device to provide a better user experience as the user will not be inundated with a large amount of information where a large percentage of that information is not of interest. In addition, the notification throttling system can improve power management by, for example, displaying a smaller number application alerts on the screen thereby preventing the screen from using power every time a notification is generated. Moreover, if a device is configured to play a sounds or flash lights when a notification is generated, there is greater power savings because those sounds are not played and the lights are not flashed when notifications are throttled.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A and 4B are illustrations of example user control interfaces for specifying and/or changing a priority group for one or more applications.

Like reference numbers and designations in the various drawings indicate like elements.

DETAILED DESCRIPTION

Figure 1:
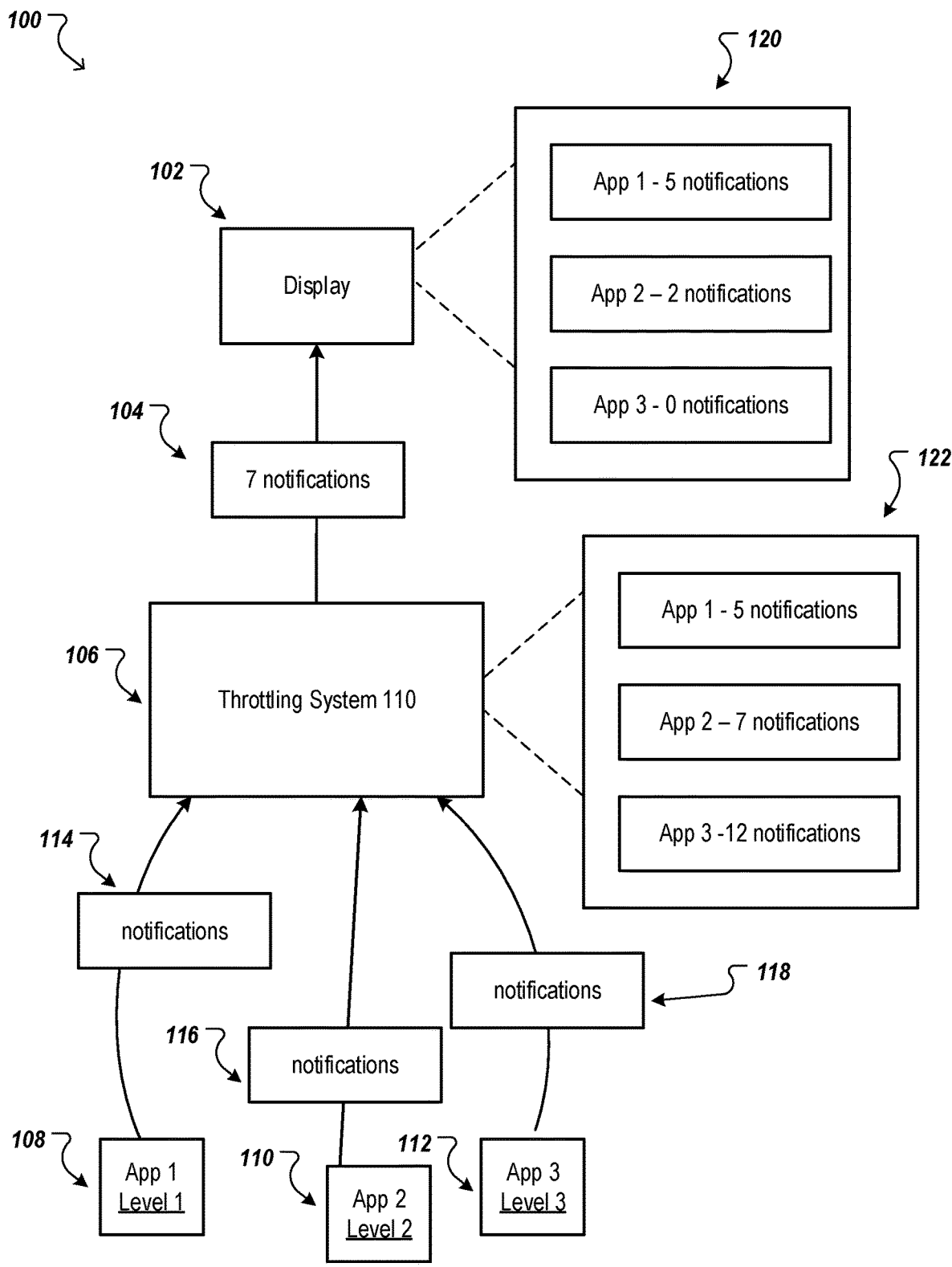
FIG. 1 is a block diagram of an environment where the notification throttling system operates.

This document discloses methods, systems, and devices that enable application notification throttling. FIG. 1 is a block diagram of an environment where a notification throttling system, or "throttling system" for sake of brevity, operates. In some embodiments, system 100 is an electronic device (e.g., an electronic tablet or a smart phone). Electronic device 100 includes a display 102 which can be a display device described further in this disclosure. Electronic device 100 further includes a notification throttling system 110. The notification throttling system 110 can be configured on the electronic device 100 to perform application notification throttling. In some implementations, the notification throttling system includes both software (e.g., instructions) and hardware (e.g., circuitry) components. The software components can be executed by the hardware (e.g., control circuitry) to perform actions of further described.

System 100 has multiple applications installed including applications 108, 110, and 112. Each application can have an associated priority. FIG. 1 illustrates application 108 with "Level 1" priority, application 110 with "Level 2" priority and application 112 with "Level 3" priority where "Level 1" denotes a high priority, "Level 2" denotes a medium priority and "Level 3" denotes a low priority. Certain applications on an electronic device, if configured to do so, generate notifications for the user. FIG. 1 illustrates application 108 generating notifications 114, application 110 generating notifications 116 and application 112 generating notifications 118. Those notifications are received by the throttling system 110.

As shown by box 122, the notification throttling system determines that application 108 generated five notifications, application 110 generated seven notifications and application 112 generated twelve notification. If the notification throttling system was not used by the electronic device 100 all twenty-four notifications would be displayed to the user and some electronic devices would alert the user twenty-four times using up battery power. As discussed above, this issue would be even more pronounced if one hundred applications were generating notifications directly for presentation. However, because electronic device 100 is equipped with the notification throttling system, not all of those notifications are presented to the user.

Box 120 illustrates that in certain implementations only a portion of the notifications is presented to the user. In this case, the throttling system selects seven notifications to be presented. All five notifications generated by application 108 are presented to the user (e.g., via display 102), two of seven notifications generated by application 110 are presented to the user, and no notifications from application 112 are presented to the user. This outcome is a result of the throttling system acting on the notifications based on the priority of each application. In this example, because application 108 has a priority of "Level 1" all notifications are presented to the user. Because application 110 has a priority of "Level 2" some of the notifications are presented to the user, and because application 112 has a priority of "Level 3" none of the notifications are presented to the user.

Figure 2:
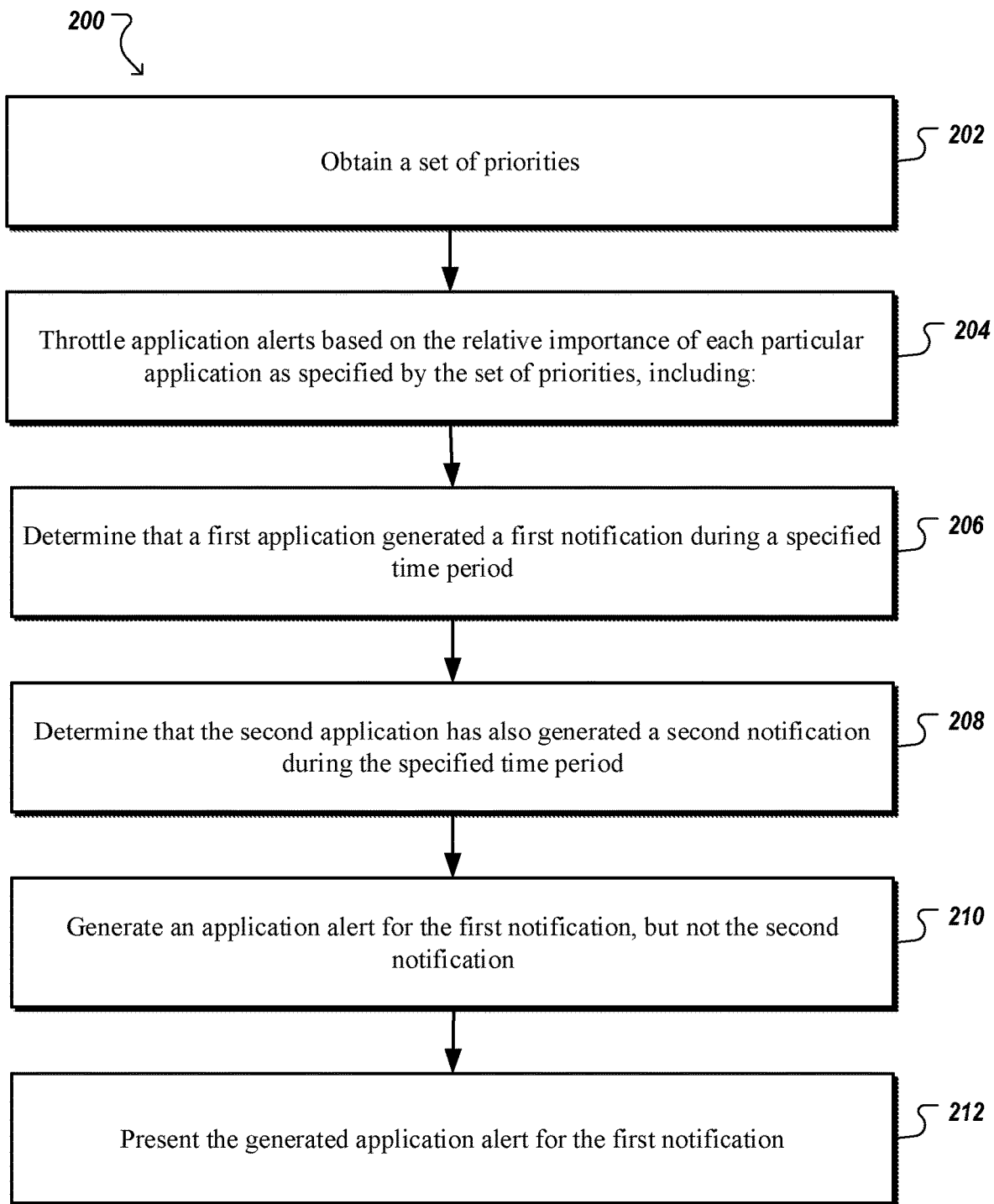
FIG. 2 is a box diagram of actions that the notification throttling system can perform to identify notifications for presentation to the user.

FIG. 2 illustrates process 200 for actions that a throttling system can perform to identify notifications for presentation to the user. At 202, the throttling system obtains a set of priorities. Each priority in the set of priorities specifies, for each particular application installed on a user device and enabled for application alerting, a relative importance of that particular application. The throttling system can use various priority schemes. For example, installed applications that are enabled for notifications can be assigned either a lower priority or a high priority (e.g., two groups). In another example, applications can be assigned to a low priority group, a high priority group, or a medium priority group. As discussed above, more priorities can be created, as needed.

At 204, the throttling system throttles application alerts based on the relative importance of each particular application as specified by the set of priorities. The throttling system takes the following actions to throttle application alerts. At 206, the throttling system determines that a first application generated a first notification during a specified time period. For example, the throttling system can be a module within a notification/alerting system or work in conjunction with the notification/alerting system of the electronic devices. The throttling system can receive the notifications from the applications installed on the electronic device. Each notification can include an application identifier, the notification message, and, in some implementations, other relevant data (e.g., third-party content). In some implementations, the operating system on the electronic device can receive notifications from the applications and input those notifications into the throttling system. The throttling system can then determine which of the notifications need alerts and which can be ignored, based on an algorithm described below. In some implementations, the throttling system intercepts a notification signal generated by each application. Before the notification gets to a notification system installed on the device, the throttling system determine whether to generate an alert or refrain from generating the alert (e.g., based on the level of relative importance of the application as described below) and, if needed, forward the alert to the notification system.

In some implementations, the throttling system retrieves the specified time period (e.g., from memory). The time period can have various durations, for example, thirty minutes, one hour, three hours, or another suitable time period. At 208, the throttling system determines that the second application has also generated a second notification during the specified time period. In this example, the first application can have a higher level of relative importance than the second application. As described above, the throttling system receives notifications generated by applications installed on the electronic device. Those notifications can include an identifier of the application. Based on the identifier, the throttling system can identify the application that generated the notification.

At 210, the throttling system generates an application alert for the first notification, but not the second notification. Alert generation is based on the first application having a higher level of relative importance than the second application and the first notification and the second notification both being generated during the specified time period. The throttling system can determine for which notification to generate alerts and for which to not generate alerts using various methods. In some implementations, generating an application alert includes, receiving, by the throttling system, a notification from an application and determining whether the notification should be suppressed (e.g., based on the importance level of the application) or whether the notification should proceed to the user (e.g., to be displayed on the screen of the electronic device). If the notification is to proceed, the notification is designated as a generated alert. In some implementations, the notification is transformed into an alert. For example, when the throttling system receives a given notification, the throttling system can determine (e.g., based on an identifier of the application embedded in the notification) the importance level of the application. If the importance level indicates that the notification should proceed to the user, the throttling system allows the notification to proceed.

In some implementations, the throttling system obtains an alert target specifying a total number of application alerts that are authorized to be presented during the specified time period. The throttling system can obtain the alert target locally from the user device or from a remote location (e.g., a server). When the alert target is obtained, the throttling system determines a portion of the alert target that has been met for the specified time period. For example, the throttling system can retrieve from memory a number of alerts that have been generated and compare that with a threshold number of alerts for the current time period. Based on the portion of the alert target that has been met for the specified period, the throttling system can throttle notifications generated by the applications by limiting notifications for a remainder of the specified period. For example, if the throttling system determines that a three hour time period has been configured and two hours of the time period elapsed, the throttling system can determine, based on the number of notification that has been generated and the total number of notification allowed, how many notification and at what time (during the hour remaining) those notification can be generated.

For example, if application one is a an email application having a higher priority than application two, a game, the throttling system makes that determination and process the notifications from those applications accordingly. In some cases, the user device will have hundreds of applications installed and will have more than two priority levels (e.g., five or six priorities). The applications are assigned a priority level and the throttling system processes notifications according to the priority levels assigned.

The throttling system generates an application alert for the first notification, but not for the second notification. Specifically, the throttling system generates an application alert for the first notification, but not the second notification, based on (i) the first application having a higher level of relative importance than the second application and (ii) the first notification and the second notification both being generated during the specified time period. For example, if the email application is an application with a higher priority level than the game, the throttling system determines that both notifications cannot be presented in view of the throttling state for the current time period, and generates an application alert for the notification from the email application and not for the game. At that point, the throttling system presents the generated application alert for the first notification (e.g., by displaying the application alert on the screen, playing a sound and/or flashing a light).

In some implementations, the throttling system limits presentation of application alerts to only those applications that are not assigned to a lowest tier of relative importance when an alert satisfaction score meets a throttle threshold. For example, if applications are split into three levels of importance (e.g., low, medium, and high), and a threshold for notifications has been reached, the throttling system refrains for generating notifications for the low importance applications. Thus, for a given application, the throttling system determines whether to generate an alert based on (i) the application being assigned to the lowest tier of relative importance, (ii) other application having a higher level of relative importance than the given application, and (iii) both being generated while the alert satisfaction score meets the throttle threshold.

At 212, the throttling system presents the generated application alert for the first notification. The presented alerts can be displayed on the lock screen or the unlocked screen. In some implementations, the throttling system plays a sound, vibrates, and/or produces another cue when presenting the alert. In some implementations, the throttling system prevents presentation of application alerts for a given application when a number of application alerts presented for the given application meets a stop threshold. That is, the throttling system can store a notification alert threshold for each application, and if the number of notifications meets the thresholds, the throttling system stops generating alerts for that application. The threshold can be based on the priority level of the application, the type of application, or another suitable criterion.

In some implementations, the throttling system adds third party content to the alerts. The throttling system determines that third party content provided by a remote system in communication with the user device is authorized for presentation within application alerts generated for a particular application, and transmits, from the user device, a third party content request to the remote system. For example, the throttling system can receive input (e.g., from a user, device manufacture, a service provider, or another suitable entity) indicating whether third party content is authorized for presentation. The throttling system can store the data from the input (e.g., in memory) indicating whether third party content is allowed. The throttling system can access the data from the input to determine whether third party content is allowed. The throttling system receives, at the user device, responsive third party content transmitted to the user device by the remote system and combining the responsive third party content and content of a particular notification into the application alert. The throttling system presents the combination of the third party content and the content of the particular notification within a display of the user device.

Figure 3:
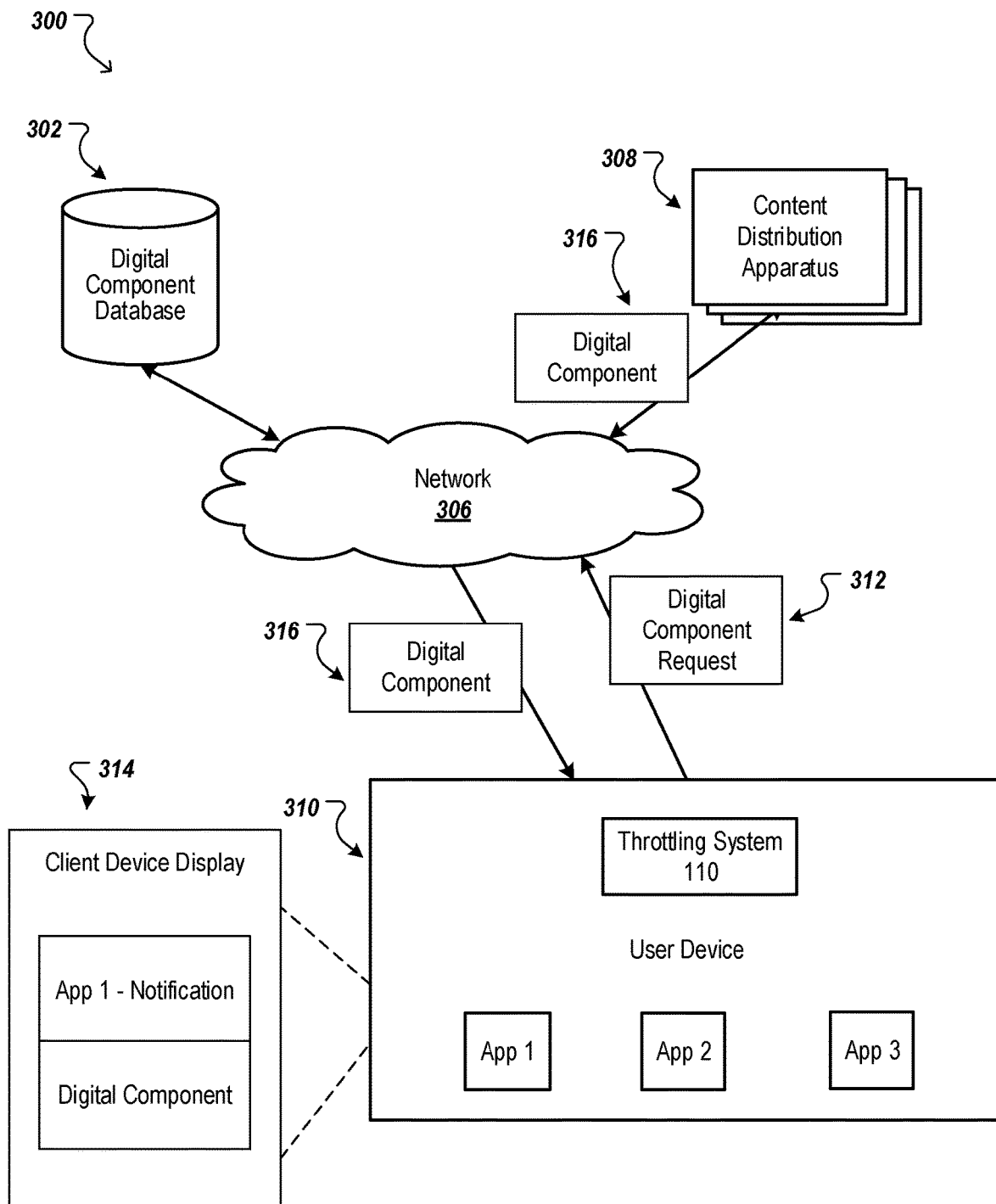
FIG. 3 shows system 300 for adding third party content to an alert.

FIG. 3 shows system 300 for adding third party content to an alert. System 300 includes user device 310 with the throttling system 110. User device 310 can include applications App 1, App 2, and App 3. If the throttling system determines that third party content is allowed for an alert, the throttling system 110 transmits a digital component request 312 through network 306.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

System 300 also includes a digital component database 302 for storing digital components and a content distribution apparatus 308 for distributing digital components. Although, the digital component database 302 and the content distribution apparatus 308 are shown as separate components of system 300, both components can reside on the same server or another network-connected device. Content distribution apparatus 308 receiving the digital component request and identifies a digital component to transmit to the user device 310. In some implementations, the digital component request includes an identifier of the digital component and the content distribution apparatus 308 identifies a component based on the received identifier. In some implementations, the content distribution apparatus 308 identifies a digital component based on information from the user device (e.g., application name, application type, device identifier, or other suitable information). The content distribution apparatus retrieves the identified digital component (e.g., digital component 316) from the digital component database 302 and transmits that digital component 316 to the user device 310. In some implementations, the content distribution apparatus 308 transmits to the user device 310 an identifier of the digital component 316 and a command to retrieve the digital component 316 from the digital component database 202.

The throttling system generates the digital component and notification together on a display (e.g., client device display 314).

In some implementations, the throttling system enables a user to assign (e.g., via a user control interface) an application to a priority group (e.g., low, medium, or high priority). The throttling system generates an application rating interface that includes user interface elements that enable user designations of the relative importance of one or multiple applications through interaction with the user interface elements. The throttling system receives the user designations of the relative importance of one or multiple applications through interaction with the user interface elements, and stores the relative importance of each application in a data store. The data store can be configured in a way where an entry in the data store specifies an application and application's relative importance according to the user designations.

Figure 4B:
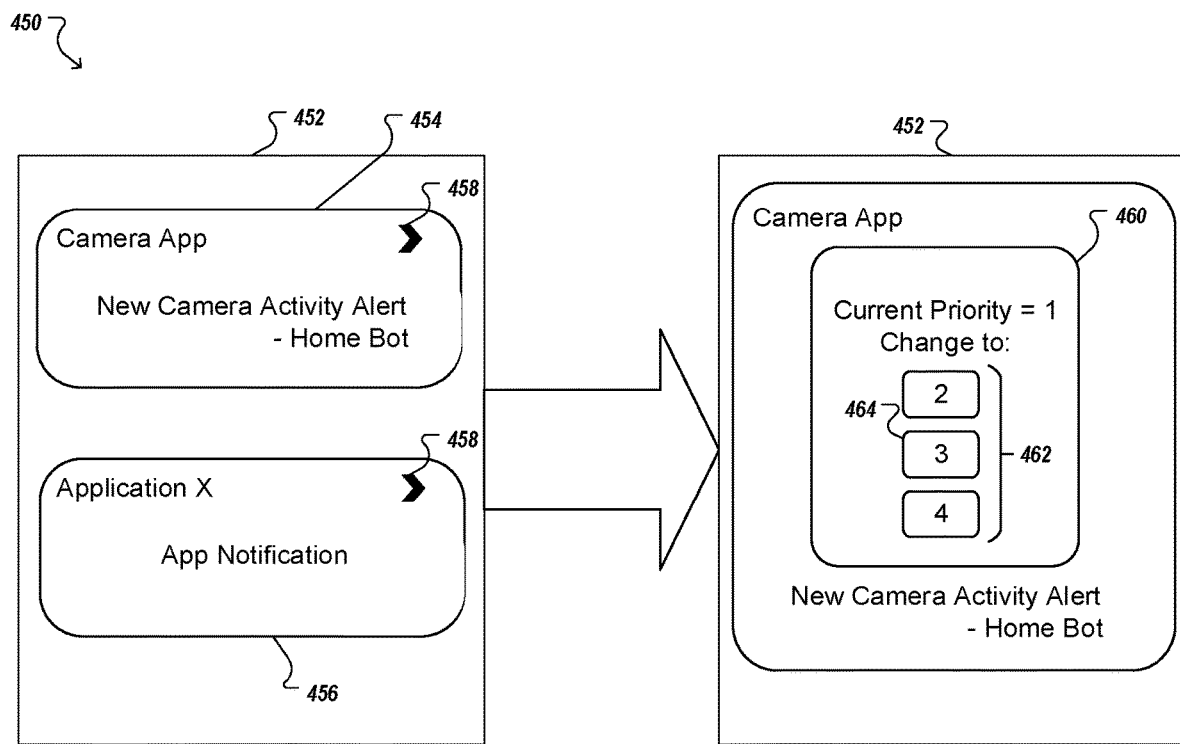

FIGS. 4A and 4B are illustrations of example user control interfaces 400 and 450 for specifying and/or changing a priority group for one or more applications. The user control interface 400 of FIG. 4A includes a list of applications 402 (e.g., App 1-App 6) for which priorities can be independently specified. For example, a priority level 404 can be specified independently for each of the applications in the list of applications 402 through user interaction with a priority drop down from a set of priority drop downs 404 that are presented next to the list of applications 402. In a particular example, a user can click, tap, or otherwise interact with the priority drop down 406 to select one of multiple different priority levels for App 1, which is identified next to the priority drop down 406. In this example, the user has selected a priority level of 1 for App 1, indicating that notifications for App 1 will be managed (e.g., throttled) as defined in the throttling rules specified for priority level 1. Other priority levels for other applications in the list of applications 402 can similarly be specified through interaction with the priority drop down corresponding to those applications.

The throttling rules for each priority level can be specified through user interaction with the user control interface 400 as well. For example, the user control interface 400 can include a throttling rule definition area 408 in which a user can specify the throttling rules for each priority level. The throttling rule definition area 408 includes a list of priority levels 410 for which rules can be independently specified. For example, each priority level in the list of priority levels 410 has a corresponding rule entry area in which notification limit 412 can be specified, an over limit action 414 (e.g., if exceeded . . . ) can be specified, and an app/total qualifier 416 (e.g., per app/total indication) can be specified by the user. In a specific example, user interaction with the various controls (e.g., drop down menus for the notification limit 412, over limit action 414, and app/total qualifier 416) has resulted in a throttling definition for priority level 1 in which notifications are always shown, irrespective of the number of notifications, which omits the requirement that the user specify any over limit action 414 or app/total qualifier because there is no limit to be exceeded in this example.

In another example, the rule definition for priority level 2 indicates that the number of notifications from apps assigned to priority level 2 is limited to 5 notifications per hour, which was assigned by user interaction with the notification limit 412 drop down control corresponding to priority level 2, which reads "Limit 5 per hour". Because the throttling definition for priority level 2 applications has a notification limit specified, the user is able to interact with the drop down controls for the over limit action 414 and the app/total qualifier 416 to further define how the notification limit 412 is qualified (e.g., on a per app or total app basis), and what action is taken when the notification limit 412 is exceeded.

As used in this document, a per app qualification (e.g., as specified by the app/total qualifier 416) specifies whether the notification limit 412 is determined on a per application basis, or in aggregate for all applications that are assigned to that specific priority level. For example, when "per app" is selected by the user for the app/total qualifier 416, as it is with respect to priority level 2, the notification limit 412 is calculated or tracked on a per application basis. In this situation, the over limit action 414 for priority level 2 will only be triggered for a specific application when the number of notifications for that specific application exceed (or meet) the specified notification limit. More specifically, with reference to priority level 2, each application that is assigned to priority level 2 is able to present up to 5 notifications per hour without triggering the over limit action 414 because the throttling rule, and more specifically the app/total qualifier 416 for priority level 2 has been set to per app.

In another example, when "total" is selected by the user for the app/total qualifier 416, as it is with respect to priority level 3, the notification limit 412 is calculated or tracked in aggregate across all applications that have been assigned to priority level 3. In this situation, the over limit action 414 for priority level 3 will be triggered when the total number of notifications across all applications that are assigned to priority level 3 reaches or exceeds 5 notifications per day, as specified in the notification limit 412 for priority level 3. To further illustrate, assume that there are two applications assigned to priority level 3. In this example, the system will track the number of notifications generated by both of these applications in aggregate (e.g., by adding the number of notifications together), and when the total number of notifications for these two applications reaches 5 notifications in a single day, the over limit action 414 will be triggered, which in this example will drop further notifications, thereby preventing presentation, and not queueing the notifications for future presentation.

Various over limit actions 414 can be specified in the throttling rules for a particular priority level. For example, as discussed above, the over limit action can be defined to drop all notifications beyond the specified notification limit 412. Alternatively, notifications beyond the specified notification limit can be queued for later viewing by the user, rather than dropped through receipt of data indicating that the user selected the "queue" option in the over limit action 414. When the "queue" option is selected, the system will not present notifications beyond the specified notification limit 412, but the system will retain those notifications so that the user can later review the notifications, e.g., by entering an appropriate menu on their device.

The user control interface 400 also includes information that can assist the user in creating and/or updating the throttling rules. For example, the user control interface 400 can include notification information 418 for the different applications in the list of applications 406. The notification information 418 presents the user with information specifying a number of notifications that have been generated (positive numbers) as well as information specifying a number of notifications that were suppressed by the system (negative numbers). In some implementations, the notification information can be delineated into daily notification information 420 and monthly notification information 422. The daily notification information 420 presents the user with a number of daily notifications generated by the application, while the monthly notification information 422 presents the user with a number of monthly notifications generated by the application. The actual number of notifications can be a total number of notifications for a last day/month, an average over a previous number of days/months, or some statistical measure of notifications generated by the applications over one or more days/months.

In a particular example, the notification information 418 for App 6 indicates that App 6 has generated 40 notifications over the past day (or as a daily average), and that App 6 has generated 600 notifications over the past month (or as a monthly average). These numbers of notifications are indicated by the positive numbers. Additionally, the notification information 418 for App 6 indicates that 37 notifications have been blocked over the past day (or as a daily average), and that 570 of the notifications generated by App 6 have been blocked over the past month (or as a monthly average). The user can leverage this information in determining how to assign applications to priority levels, and/or how to define the throttling rules for each of the priority levels. In some implementations, when the user assigns the application to a new priority level, the notification information 418 for that application can be updated to reflect the number of notifications that would have been blocked using the newly assigned priority level.

FIG. 4B shows another illustration of an example user control interface 450 for specifying and/or changing a priority group for one or more applications. The example control interface 450 is an example of an interface that enables the user to specify and/or change the priority level of applications directly within notifications generated by the applications. For example, the example control interface 450 initially shows two notifications on a user display 452. The first notification 454 is an alert regarding camera activity generated by a camera application, and the second notification 456 is a notification from application X. In this example, both of the notifications include a priority control 458. The priority control 458 is interactive, and enables a user to launch a priority menu 460 by interacting with the priority control 458. In other words, the system launches and/or presents the priority menu 460 in response to detecting user interaction with the priority control 458.

The priority menu 460 presents the user with information specifying a current priority level assigned to notifications generated by the application corresponding to the priority control that was interacted with by the user. For example, the priority menu 460 indicates that notifications generated by the camera application are currently assigned to priority level 1. The priority menu also generates and presents the user with interactive elements 462 with which the user can assign notifications of the camera application to a different priority level. For example, when the system detects user interaction with the interactive element 464, the system can identify the interactive element as corresponding to priority level 3, and reassign notifications from the camera application to priority level 3. Assigning the notifications from the camera application to priority level 3 results in the throttling rules defined for priority level 3 being applied to the notifications generated by the camera application.

Figure 5:
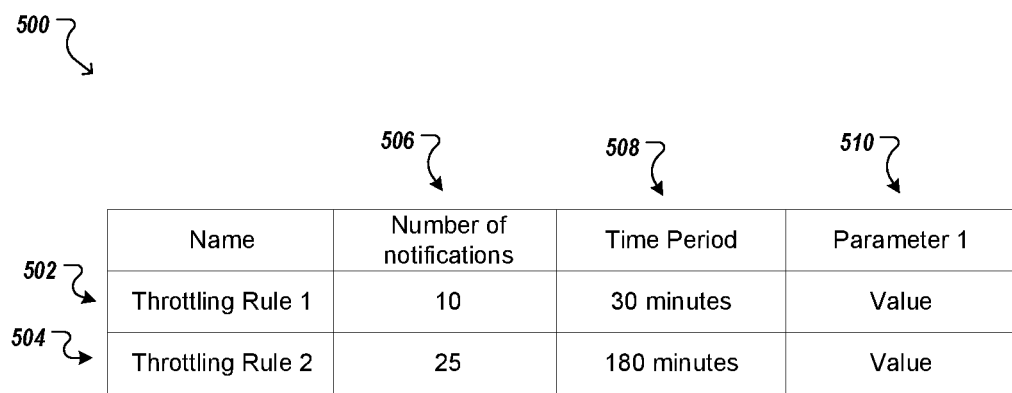
FIG. 5 illustrates a data structure for storing throttling rules.

FIG. 5 illustrates a data structure 500 for storing throttling rules. Each rule has a corresponding field 506 indicating a threshold number of notifications allowed and filed 508 for a time period. Thus, rule 502 indicates that for a thirty minute time interval only ten total notifications are allowed. Filed 510 is a field for another parameter. For example, field 510 can include a priority value (e.g., low priority). Thus, the throttling system can interpret rule 504 as a maximum of twenty five notification allowed for a three-hour period for low priority applications. Other fields with other parameters can be included in data structure 500. For example, a field can be added to the data structure that specifies multiple priorities (e.g., throttling applied to applications of low priority and medium priority). In some implementations, data structure 500 includes a state field which specifies how many notifications have been sent in the current time period. In some implementations, the throttling system accesses the data structure 500 and retrieves one or more rules. The throttling system extracts the data from the fields and stores it in memory. When the throttling system receives a notification from an application, the throttling system can access the rule and determine, based on the rule and the number of alerts generated during the current time period, whether the notification should be transformed into an alert and presented to the user or whether the throttling system should suppress the notification.

Figure 6:
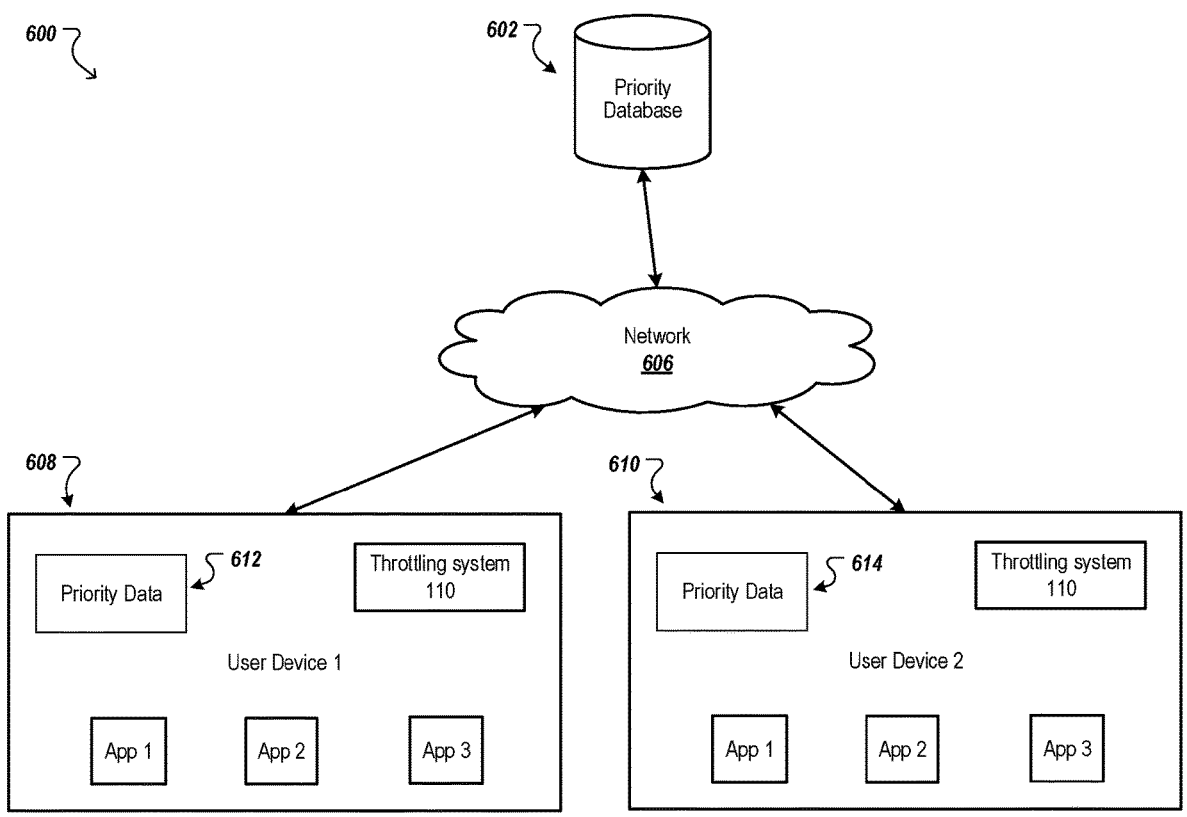
FIG. 6 illustrates a system for storing priority data for applications on multiple devices belonging to a user.

FIG. 6 illustrates system 600 for storing priority data for applications on multiple devices belonging to the user (e.g., connected to one account). System 600 includes two user devices (user device 608 and user device 610). Each user device includes a throttling system 110 that controls throttling on that device. User device 608 includes priority data 612. Priority data 612 can be one or more data structures for storing assigned priority for each application on the device. Priority data 614 on device 610 can also be one or more data structures for storing priority data for each application on the device. When a user (e.g., at device 608) assigns a priority level to a new or an existing application, priority data 612 is updated with the new assignment. However, if the user has multiple devices, it can be useful to assign the priority level to an application once and have that assignment replicated to other devices belong to the user. Therefore, system 600 includes a priority database 602. When the assignment of a priority level to an application is received at device 608, that assignment can be replicated (e.g., through network 606) to the priority database 602 and to user device 610. The throttling system can perform this process from device 610 as well. Although, only two user devices are shown in FIG. 6, this process can be scaled to any number of devices. In some implementations, priority data 612 includes throttling rules that are also replicated to other devices belonging to the user. For example, data structure 500 of FIG. 5 can be stored in the priority data 612 and/or 614 and transmitted to priority database 602.

Application priority data 612 can be propagated in various ways. For example, the priority data 612 can synchronize to priority database 602 at a specific time interval and from the priority database 602 to other devices of the user thereafter. In some implementations, the synchronization can occur when an update to the priority data 612 occurs on one of the devices of the user. The data can be stored in a database with an identifier of the user. In some implementations, the database includes a list of devices of the user, thus, enabling propagation to those devices. When a change to the priority data 612 occurs on a user device (e.g., user device 608), the user device can transmit a message (e.g., one or more packets) to the priority database 602 indicating that an update to the priority data 612 has occurred. The priority database 602 can generate a request for the new data, and when the new data is received, the priority database 602 can transmit a message (e.g., one or more packets) to user device 610 to synchronize the new data. Device 610 can receive the new data in priority database 614. Thus, in this scenario the throttling system is distributed among the three devices.

In some implementations, the throttling system detects when two devices of the user (e.g., user device 608 and user device 610) are located in proximity to each other and determines whether the priority databases are synchronized (e.g., via version numbers assigned to each database). If the priority databases are not synchronized, the throttling system can synchronize the databases by exchange data directly between the two devices. The priority databases (e.g., priority database 612 and priority database 614) can be part of user preferences that can be synchronized among the devices of the user. The synchronization can occur wirelessly (e.g., using a Wi-Fi connection, a Bluetooth connection, or another suitable wireless connection) or via a wired connection.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on an electronic device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
presenting, at a client device, a control interface that displays a set of applications for which priorities can be independently specified;
detecting interaction with a priority adjustment element that is (i) presented in the control interface, (ii) corresponds to a particular application among the set of applications, (iii) and modifies a first priority level assigned to the particular application to an updated priority level among a plurality of available priority levels;
throttling application alerts for notifications generated by the particular application based on the updated priority level of the particular application, including:
presenting, at the client device, application alerts for notifications generated by the particular application while a number of application alerts shown for the particular application are less than a maximum number of alerts allowed for applications assigned the updated priority level; and
preventing presentation of an additional application alert for an additional notification generated by the particular application after the maximum number of alerts allowed for applications assigned to the updated priority level has been reached.

2. The method of claim 1, further comprising:
obtaining an alert target specifying a total number of application alerts that are authorized to be presented by a plurality of applications on the client device; and
determining a portion of the alert target that has been met, wherein:
throttling application alerts for notifications generated by the particular application includes preventing presentation of a given application alert for a given notification generated by the particular application in response to determining the portion of the alert target that has been met.

3. The method of claim 2, further comprising reducing notifications for another application among the plurality of applications based on the portion of the alert target that has been met.

4. The method of claim 2, wherein throttling application alerts comprises limiting presentation of application alerts to only those applications that are not assigned a lowest tier of relative importance when the portion of the alert target has been met.

5. The method of claim 2, further comprising:
presenting, at the client device, a throttling rule definition area in which a user specifies throttling rules for one or more priority levels;
obtaining, through user interaction with the throttling rule definition area, the maximum number of alerts allowed for applications assigned to the updated priority level.

6. The method of claim 5, further comprising:
obtaining, through user interaction with the throttling rule definition area, a different maximum number of alerts allowed for applications assigned to a different priority level; and
throttling application alerts for notifications generated by applications assigned to the different priority level based on the different number of alerts allowed for applications assigned to the different priority level.

7. The method of claim 6, further comprising:
obtaining, through user interaction with the throttling rule definition area, an aggregate maximum number of alerts allowed for all applications on the client device; and
limiting notifications of multiple applications on the client device in response to a determination that the aggregate maximum number of alerts has been reached.

8. A system, comprising:
one or more memory devices; and
control circuitry coupled to the one or more memory devices and configured to perform operations comprising:
presenting, at a client device, a control interface that displays a set of applications for which priorities can be independently specified;
detecting interaction with a priority adjustment element that is (i) presented in the control interface, (ii) corresponds to a particular application among the set of applications, (iii) and modifies a first priority level assigned to the particular application to an updated priority level among a plurality of available priority levels;
throttling application alerts for notifications generated by the particular application based on the updated priority level of the particular application, including:
presenting, at the client device, application alerts for notifications generated by the particular application while a number of application alerts shown for the particular application are less than a maximum number of alerts allowed for applications assigned the updated priority level; and
preventing presentation of an additional application alert for an additional notification generated by the particular application after the maximum number of alerts allowed for applications assigned to the updated priority level has been reached.

9. The system of claim 8, wherein the control circuitry is configured to perform operations further comprising:
obtaining an alert target specifying a total number of application alerts that are authorized to be presented by a plurality of applications on the client device; and
determining a portion of the alert target that has been met, wherein:
throttling application alerts for notifications generated by the particular application includes preventing presentation of a given application alert for a given notification generated by the particular application in response to determining the portion of the alert target that has been met.

10. The system of claim 9, wherein the control circuitry is configured to perform operations further comprising reducing notifications for another application among the plurality of applications based on the portion of the alert target that has been met.

11. The system of claim 9, wherein throttling application alerts comprises limiting presentation of application alerts to only those applications that are not assigned a lowest tier of relative importance when the portion of the alert target has been met.

12. The system of claim 9, wherein the control circuitry is configured to perform operations further comprising:
presenting, at the client device, a throttling rule definition area in which a user specifies throttling rules for one or more priority levels;
obtaining, through user interaction with the throttling rule definition area, the maximum number of alerts allowed for applications assigned to the updated priority level.

13. The system of claim 12, wherein the control circuitry is configured to perform operations further comprising:
obtaining, through user interaction with the throttling rule definition area, a different maximum number of alerts allowed for applications assigned to a different priority level; and
throttling application alerts for notifications generated by applications assigned to the different priority level based on the different number of alerts allowed for applications assigned to the different priority level.

14. The system of claim 13, wherein the control circuitry is configured to perform operations further comprising:
obtaining, through user interaction with the throttling rule definition area, an aggregate maximum number of alerts allowed for all applications on the client device; and
limiting notifications of multiple applications on the client device in response to a determination that the aggregate maximum number of alerts has been reached.

15. A non-transitory computer storage medium encoded with a computer program, the program comprising instructions that when executed by one or more data processing apparatus cause the one or more data processing apparatus to perform operations comprising:
presenting, at a client device, a control interface that displays a set of applications for which priorities can be independently specified;
detecting interaction with a priority adjustment element that is (i) presented in the control interface, (ii) corresponds to a particular application among the set of applications, (iii) and modifies a first priority level assigned to the particular application to an updated priority level among a plurality of available priority levels;
throttling application alerts for notifications generated by the particular application based on the updated priority level of the particular application, including:
presenting, at the client device, application alerts for notifications generated by the particular application while a number of application alerts shown for the particular application are less than a maximum number of alerts allowed for applications assigned the updated priority level; and
preventing presentation of an additional application alert for an additional notification generated by the particular application after the maximum number of alerts allowed for applications assigned to the updated priority level has been reached.

16. The non-transitory computer storage medium of claim 15, wherein the instructions cause the one or more data processing apparatus to perform operations further comprising:
obtaining an alert target specifying a total number of application alerts that are authorized to be presented by a plurality of applications on the client device; and
determining a portion of the alert target that has been met, wherein:
throttling application alerts for notifications generated by the particular application includes preventing presentation of a given application alert for a given notification generated by the particular application in response to determining the portion of the alert target that has been met.

17. The non-transitory computer storage medium of claim 16, wherein the instructions cause the one or more data processing apparatus to perform operations further comprising reducing notifications for another application among the plurality of applications based on the portion of the alert target that has been met.

18. The non-transitory computer storage medium of claim 16, wherein throttling application alerts comprises limiting presentation of application alerts to only those applications that are not assigned a lowest tier of relative importance when the portion of the alert target has been met.

19. The non-transitory computer storage medium of claim 16, wherein the instructions cause the one or more data processing apparatus to perform operations further comprising:
presenting, at the client device, a throttling rule definition area in which a user specifies throttling rules for one or more priority levels;
obtaining, through user interaction with the throttling rule definition area, the maximum number of alerts allowed for applications assigned to the updated priority level.

20. The non-transitory computer storage medium of claim 19, wherein the instructions cause the one or more data processing apparatus to perform operations further comprising:
obtaining, through user interaction with the throttling rule definition area, a different maximum number of alerts allowed for applications assigned to a different priority level; and
throttling application alerts for notifications generated by applications assigned to the different priority level based on the different number of alerts allowed for applications assigned to the different priority level.

* * * * *